United States Patent [19]

Dam G. et al.

[11] Patent Number: 5,069,716

[45] Date of Patent: * Dec. 3, 1991

[54] PROCESS FOR THE PRODUCTION OF LIQUID STEEL FROM IRON CONTAINING METAL OXIDES

[75] Inventors: Oscar G. Dam G.; Henry R. Bueno C.; Gerardo A. Contreras L.; Yura Gancthev V.; Nicolas O. Guevara R., all of Bolivar, Venezuela

[73] Assignee: C.V.G. Siderurgica del Orinoco, C.A., Bolivar, Venezuela

[*] Notice: The portion of the term of this patent subsequent to Nov. 12, 2008 has been disclaimed.

[21] Appl. No.: 512,216

[22] Filed: Apr. 20, 1990

Related U.S. Application Data

[63] Continuation-in-part of Ser. No. 455,232, Dec. 22, 1989, which is a continuation-in-part of Ser. No. 115,911, Nov. 25, 1987, abandoned.

[51] Int. Cl.$^5$ .................. C21B 13/02; C21B 13/14
[52] U.S. Cl. .................. 75/495; 423/651; 75/490; 75/451
[58] Field of Search .......... 423/138, 650, 651; 75/34, 36, 444, 445, 446, 450, 451, 490, 491, 495

[56] References Cited

U.S. PATENT DOCUMENTS

| | | | |
|---|---|---|---|
| Re. 32,247 | 9/1986 | Stephens, Jr. | 75/446 |
| 3,210,180 | 10/1965 | Jukkola | 75/451 |
| 3,303,017 | 2/1967 | Mayer et al. | 75/451 |
| 3,364,011 | 1/1968 | Porter et al. | 75/451 |
| 3,375,098 | 3/1968 | Marshall | 75/496 |
| 3,562,780 | 2/1971 | Eisenberg | 75/451 |
| 3,635,456 | 1/1972 | Anthes et al. | 266/197 |
| 3,936,296 | 2/1976 | Campbell | 75/446 |
| 3,985,547 | 10/1976 | Iacotti et al. | 75/451 |
| 4,045,214 | 8/1977 | Wetzel et al. | 75/446 |
| 4,046,557 | 9/1977 | Beggs | 75/496 |
| 4,253,867 | 3/1981 | Price-Falcon et al. | 75/495 |
| 4,261,734 | 4/1981 | Price-Falcon et al. | 75/495 |
| 4,425,159 | 1/1984 | Nixon | 75/505 |
| 4,528,030 | 7/1985 | Vera et al. | 75/496 |
| 4,566,904 | 1/1986 | von Bogdandy et al. | 75/446 |
| 4,668,284 | 5/1987 | Vera et al. | 75/495 |
| 4,880,458 | 11/1989 | Martinez-Vera et al. | 75/498 |
| 4,940,488 | 7/1990 | Maeda et al. | 75/446 |
| 4,946,498 | 8/1990 | Weber | 75/446 |

FOREIGN PATENT DOCUMENTS

| | | | |
|---|---|---|---|
| 534830 | 12/1956 | Canada | 75/451 |
| 1268478 | 6/1961 | France | 75/451 |

Primary Examiner—Gary P. Straub
Attorney, Agent, or Firm—Bachman & LaPointe

[57] ABSTRACT

The present invention relates to a process for the production of liquid steel from iron containing metal oxides and, more particularly, a process for the direct production of iron-containing metal oxides wherein the hot discharge of direct reduced iron (DRI or sponge iron) is fed to a melting furnace with the process gases from the direct production furnace for refining the DRI to liquid steel.

18 Claims, 1 Drawing Sheet

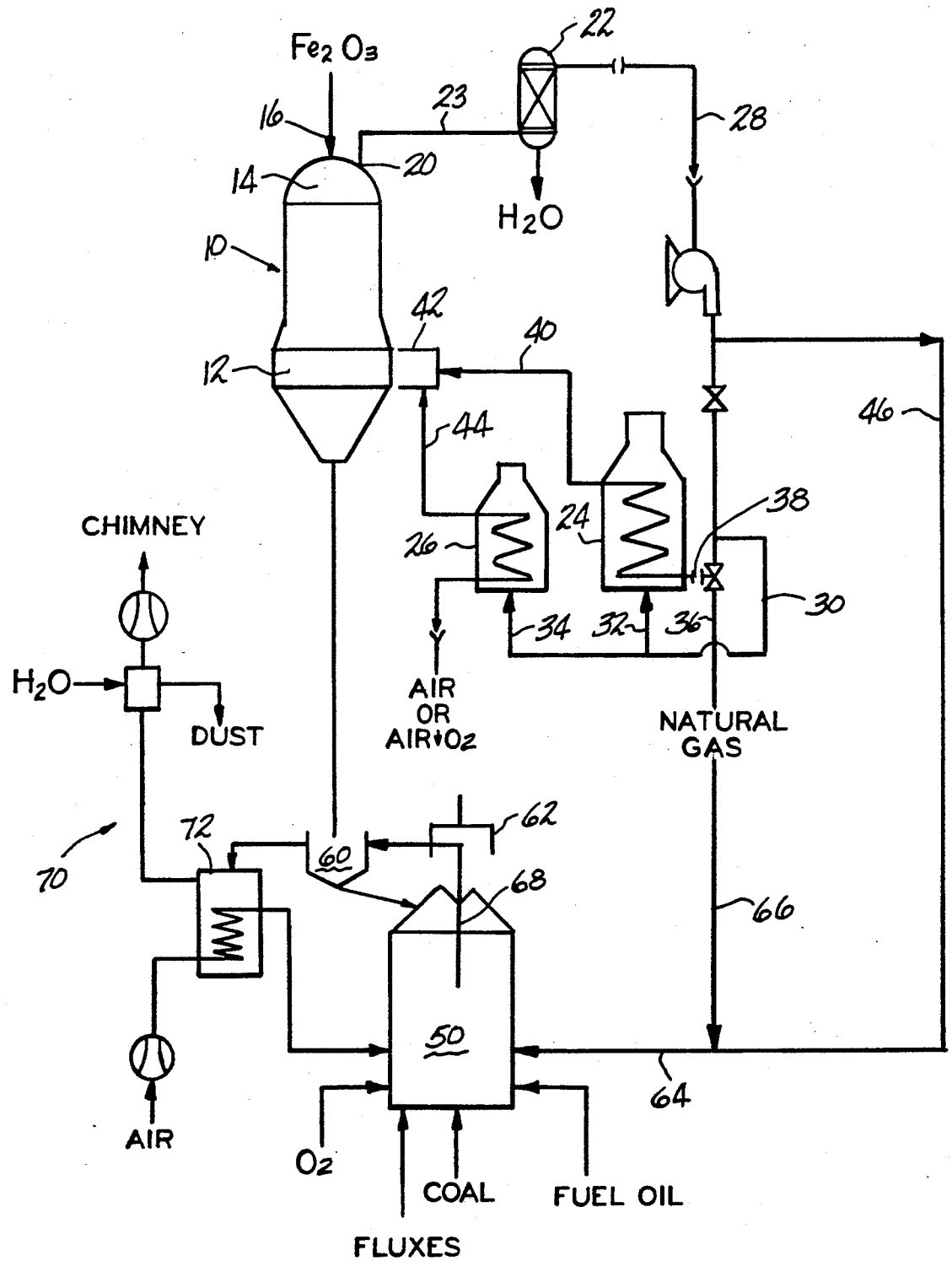

PROCESS FOR THE PRODUCTION OF LIQUID STEEL FROM IRON CONTAINING METAL OXIDES

CROSS-REFERENCE TO RELATED APPLICATIONS

This is a continuation-in-part of co-pending U.S. patent application Ser. No. 455,232, filed Dec. 22, 1989, allowed, which is a continuation-in-part of U.S. patent application Ser. No. 115,911, filed Nov. 25, 1987, now abandoned.

BACKGROUND OF THE INVENTION

The present invention relates to a process for the production of liquid steel from iron containing metal oxides and, more particularly, a process for the direct production of liquid steel wherein a hot discharge of direct reduced iron (DRI or sponge iron) is fed to a melting furnace with the process gases from the direct reduction furnace for refining the DRI to liquid steel.

It is known in the prior art to convert DRI (direct reduced iron or sponge iron) from the direct reduction of iron containing metal oxides to molten form for producing liquid steel. Typical processes disclosed in the prior art involve continuous processes to obtain molten iron and to use the molten iron to produce steel. U.S. Pat. No. 4,585,476 discloses a method for producing steel which combines a direct reduction vessel with a basic oxygen furnace. In the process of the '476 patent, the DRI produced by the direct reduction of iron containing metal oxides is loaded into a basic oxygen furnace. During the melting and refining process in the oxygen furnace enough reducing gas is produced to reduce iron ore to DRI in the reduction operation.

Naturally, it would be highly desirable to provide a process for the production of liquid steel from iron containing metal oxides which combines direct reduction reactors with steelmaking furnaces wherein the reduction of the metal oxides generates enough reducing gas in situ which can be used as an energy source for the melting furnace used to produce liquid steel.

Accordingly, it is the principle object of the present invention to provide an improved process for the producing of liquid steel from iron containing metal oxides.

It is a particular object of the present invention to provide a process as set forth above which employs a direct reduction reactor in combination with a steelmaking furnace.

It is a still further object of the present invention to provide a process as set forth above wherein the reduction process generates reducing gas in situ in the reduction vessel in an amount sufficient to be used as an energy source for the steelmaking melting furnace.

Further objects and advantages of the present invention will appear hereinbelow.

SUMMARY OF THE INVENTION

In accordance with the present invention the foregoing objects and advantages are readily obtained.

The present invention is drawn to a process for the production of liquid steel from metal oxides containing iron which relies on the direct reduction of the metal oxides with the reformed gas.

The process for the direct reduction of metal oxides containing iron to a metallized iron product in accordance with the present invention comprises providing a reduction reactor having a reaction zone and partially metallized iron oxide material and direct reduced iron (DRI) in the reaction zone, forming a reformed reduction gas rich in $H_2$ and CO having an oxidation degree in the range of from about 0.05 to about 0.08 in the reaction zone, and contacting the iron containing metal oxide material in the reaction zone with the reformed reducing gas to effect reduction of iron oxide to iron. The top gases removed from the reduction reactor are fed to a melting furnace together with the direct reduced iron (DRI) for refining the DRI to liquid steel. The top gas has a composition by volume comprising from about 28% to about 36% hydrogen, from about 17% to about 21% carbon monoxide, from about 13% to about 17% carbon dioxide, from about 2% to about 7% methane, from about 16% to about 18% nitrogen and about 12% to about 17% water vapor.

In accordance with the present invention, the reformed gas is produced in sites with the reduction reactor by mixing the top gas recycled from the reactor with natural gas, preheating the gas mixture to a temperature in the range of from about 650° C. to about 750° C., mixing air, preferably enriched with oxygen, preheated to a temperature in the range from about 750° C. to about 800° C. with the preheated top gas and natural gas mixture in a mixing chamber, partially combusting said gas mixture to produce a feeder gas having a temperature of 1000-1100° C., an oxidation degree of from about 0.30 to about 0.35 and introducing the feeder gas into the reaction zone. Exposure of this gas mixture to the hot DRI metallized iron in the reaction zone causes a highly endothermic reforming reaction. The resulting reformed reduction gas has a composition by volume consisting essentially of from about 45% to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor having an oxidation degree in the range of from about 0.05 to about 0.08 in the reduction zone.

The process of the present invention allows for the reaction zone of a direct reduction reactor to be employed for the simultaneous production of the reformed gas for use in the reduction process and the actual direct reduction of the iron containing oxide material. In addition, the process of the present invention allows for the production of liquid steel in a melting furnace located downstream of the reduction reactor by employing a portion of the top gases as an energy source for refining the DRI produced in the reduction reactor.

BRIEF DESCRIPTION OF THE DRAWING

The figure is a schematic illustration of an apparatus for performing the process of the present invention.

DETAILED DESCRIPTION

The process for the production of liquid steel from iron-containing metal oxides in accordance with the present invention may be carried out using the apparatus schematically illustrated in the FIGURE.

A shown in the FIGURE, the apparatus comprises a reduction reactor 10 having a combined reforming-reduction reaction zone 12, an iron oxide feed preheat and prereduction zone 14, an inlet 16 for introducing an iron-containing metal oxide feed into the reactor, and an outlet 18 for withdrawing direct reduced metallized iron. The DRI withdrawn from reactor 10 is fed to a holding bin 60 where it is preheated by the off gases from melting furnace 50 prior to loading same in the melting furnace The reactor also has an outlet 20 for permitting the removal of top gases.

The iron-containing metal oxides introduced into the reactor may be in pellet form. Typically, they contain from about 63% to about 68% iron by weight. The direct reduced iron withdrawn from the reactor typically contains from about 85% to about 90% iron by weight.

The top gas which is withdrawn has a composition by volume consisting essentially of from about 28% to 36% hydrogen, from about 17% to about 21% carbon monoxide, from about 13% to about 17% carbon dioxide, from about to about 7% methane, from about 16% to about 18% nitrogen and from about 12% to about 17% water vapor. Its temperature is typically in the range of from about 300 to about 350° C. It also typically has a degree of oxidation $\eta_o$ the range of from about 0.33 to 0.35 and reducing power $\eta_R$ in the range of 1.6 to 1.7. As used herein, $$\eta_O = \frac{CO_2 + H_2O}{CO_2 + H_2O + CO + CO_2} \quad (1)$$

and $$\eta_R = \frac{CO + H_2}{CO_2 + H_2O} \quad (2)$$

The top gases withdrawn from the reactor 10 are passed to a unit 22 via conduit 23 for cooling the gases to a temperature in the range of about 40° C. to about 60° C. and for removing water. The amount of water remaining in the gases after they pass through unit 22 is from about 1% to about 3% by volume. The unit 22 may comprise any suitable water separator know in the art.

After dewatering, the top gas is split. A first portion of the gas is used as a fuel for preheaters 24 and 26 which is delivered thereto from unit 22 via lines 28, 30, 32 and 34. A second portion of top gas is mixed with natural gas via line 36 in a ratio of 4:1 and recycled to the preheater 24 via line 38. In the preheater 24, the top gas-natural gas mixture is heated to a temperature in the range of from about 650° C. to about 850° C., preferably to a temperature in the range of from about 680° to about 720° C. The heated top-natural gas mixture flows via a conduit 40 to a mixing combustion chamber 42 at a flow rate of 1000 to 1100 NM³/ton DRI. The remaining portion of top gas is delivered via line 46 to melting furnace 50 as will be described hereinbelow.

Air, preferably enriched with oxygen in a ratio of air to oxygen of 7:1, 1:7 is heated by the preheater 26 to a temperature in the range of from about 650° C. to about 750° C., preferably to a temperature in the range of from about 680° to about 720° C. The heated air is then transported to the mixing chamber 30 via conduit 44 at a flow rate of 70 NM³/ton DRI and combined with the mixture of natural gas and top gas. Prior to introduction into the reaction zone 12, the air—natural gas—top gas mixture is partially combusted. This partial combustion raises the temperature to a temperature above 850° C. and preferably to a temperature of between 1000°–1100° C. This partially oxidized gas is delivered to the reaction zone 12 stoichiometrically balanced to obtain a $CH_4/(CO_2+H_2O)$ ratio of about 0.63:1 to about 0.67:1 and an oxidation degree of 0.30 to 0.35. In the mixing chamber, the gas mixture generally has a composition by volume of from about 35% to about 38% hydrogen, from about 15% to about 17% carbon monoxide, from about 18% to about 20% carbon dioxide, from about 15% to about 16% methane, from about 20% to about 22% nitrogen, from about 4% to about 7% water vapor, and from about 0.02% to about 0.3% $C_2H_6$. The entering gas mixture preferably has a degree of oxidation in the range of from about 0.30 to about 0.35 and a reducing power in the range of from about 2% to 3%.

The gas stream from the mixing chamber 30 is introduced into the reaction zone 12 at a flow rate of 1100 NM³/ton DRI. The gas is thus placed in intimate contact with hot descending DRI material and/or the partially metallized iron oxide bed in the reaction zone 12. Under these circumstances, the metallic solid iron acts as a catalyst providing from about 12 to 16 sq. met./gr. iron specific surface area for the catalytic reaction. The heat from its surfaces causes a highly endothermic reforming reaction to occur. This reaction is as follows:

$$CH_4 + CO_2 = 2H_2 + CO \quad (1).$$

During the reaction, the pressure in the reactor is 1.2 atm.

The resulting reformed gas has a composition by volume of from about 45 to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor. Typically, the reformed gas is present in an amount from about 1100 NM³/ton to about 1450 NM³/ton with respect to the iron oxide material.

It has been found that as a result of the endothermic reaction, the temperature of the gas in the reaction zone decreases to a reaction temperature in the range of from about 820° C. to about 850° C.

It also has been found that this reformed reducing gas has a degree of oxidation in the range of about 0.05 to about 0.09 and a reducing power in the range of from about 11 to about 29.

The endothermic reaction (1) provides the amount of hydrogen and carbon monoxide required to carry out the following reduction reaction:

$$2FeO + H_2 + CO = Fe + H_2O + CO_2 \quad (2)$$

This reaction occurs in the reaction zone simultaneously with the reforming reaction at the solid surface. This greatly adds to the overall efficiency of the process. The reaction (2) also provides the carbon dioxide necessary to continuously maintain the reforming reaction.

The ascending reducing gas produced in zone 12 has a composition containing methane, carbon monoxide, carbon dioxide, hydrogen, nitrogen and water vapor. A typical composition by volume is as follows: 5.4% $CH_4$, 25.5% CO, 5.1% $CO_2$, 46.5% $H_2$, 1.5% $H_2O$ and 16.1% $N_2$. This ascending gas contains sufficient reducing power and temperature to preheat and prereduce the iron oxide feed descending in zone 14 of the reactor 10.

As noted above, the DRI removed from the reduction reactor is loaded in a bin 60 which is suitably located in the melting furnace 50 hot off gas duct. In this manner the DRI may be stored and kept hot until it is finally loaded into the melting furnace. The DRI produced in the reduction reactor described above has a carbon content of from about 12% to about 17%. In addition to the DRI, scrap metal may be likewise stored in a bin 62 which is heated by the melting furnace off gases. In order to produce liquid steel, the hot DRI is fed to the melting furnace from bin 60 along with the preheated scrap from bin 62 and, if desired, liquid metal or pre-melted iron.

As previously noted, top gas from the reduction reactor 10 is used as an energy source to melt the DRI and refine it into liquid steel in melting furnace 50. The top gas is delivered to the furnace 50 via conduit 64 wherein the top gas can be mixed with natural gas from conduit 66. In addition, the top gas—natural gas mixture may be supplemented with additional fuel sources such as coal, fuel oil, heavy hydrocarbons, oxygen, oxygen containing gas and mixtures thereof which are injected into the bottom of the melting furnace to melt the DRI and refine the iron melt.

Finely divided coal when required to balance the carbon from the high carbon or DRI autofueling pellets, for melting purposes, is pneumatically loaded using nitrogen or hydrocarbons such as methane or propane as transport gas. The cooling of the bottom injection nozzles is achieved by hydrocarbons cracking.

Finely divided fluxes are injected either through the bottom of the melting furnace when the liquid metal pool is formed, or with top lance, according to the neutrality of the slag and the required amount of steel. The amount of gas generated per ton of steel depends on the relationship of the liquid to solid loads in the melting furnace, coal composition and the preheated gas of carbon and metallization of the DRI. Top oxygen lances are used to ensure the total post-combustion of the gases generated during melting and refining process, such gas is mainly a mixture of carbon monoxide and hydrogen, the sum of which is from 70-95%. The post-combustion practice in the top of the liquid metal-slag bath, will increase the temperature of the system up to 2000° C., improving the energy efficiency use in the melting furnace.

The hot gases leaving the melting system before entering in the cooling and washing system 70, are conveyed through a suitable refractory lined duct 68 to a solid heat exchange system to preheat, by direct or indirect contact, the scrap, and by indirect contact the DRI contained in a charging bin linking the reduction and the melting furnaces, and to preheat the oxygen enriched air in preheater 72 prior to delivery to the melting furnace 50. The gases then enter the cooling and washing system 70 where cooling water is passed through and the dust is picked up. The fan impels the gas outside of the system to the stack.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the production of liquid steel from iron-containing metal oxides comprising:
   (a) providing a reforming-reduction reactor having a bed of partially metallized iron oxide material and a bed of direct reduced iron within said reforming-reduction reactor;
   (b) feeding iron-containing metal oxides to the reforming-reduction reactor;
   (c) providing a melting furnace having a melting zone;
   (d) mixing top gas recycled from said reforming-reduction reactor with natural gas;
   (e) preheating said top gas and natural gas mixture to a temperature in the range of from about 650° to about 850° C.;
   (f) mixing air preheated to a temperature in the range of from about 650° C. to about 750° C. with said preheated top gas and natural gas mixture in a mixing chamber;
   (g) partially combusting said mixture to a temperature of between 850° C. to 1100° C. wherein said mixture has a degree of oxidation in the range of from about 0.30 to about 0.35 and a reducing power in the range of form about 2 to 3;
   (h) feeding said partially combusted mixtured to said direct reduced iron in said reforming-reduction reactor so as to form a reformed reducing gas comprising $H_2$ and CO and having an oxidation degree in the range of from about 0.05 to about 0.08 in said reforming-reduction reactor;
   (i) contacting said iron-containing metal oxides in said reforming-reduction reactor with said reformed reducing gas so as to effect reduction to obtain a direct reduced iron;
   (j) withdrawing said direct reduced iron from said reforming-reduction reactor;
   (k) contacting said DRI metallized iron in said melting zone of said melting furnace with a material selected from the group consisting of preheated scrap, liquid metal, metallic iron, and mixtures thereof and melting said material in said melting zone; and
   (l) withdrawing top gas from said reforming-reduction reactor and feeding said top gas as a fuel source to said melting furnace for heating said melting zone so as to melt said DRI metallized iron and material.

2. A process according to claim 1 wherein said reformed gas consists essentially of from about 45% to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor.

3. A process according to claim 1 which comprises:
preheating said top gas and natural gas mixture in steps to a temperature in the range of from about 650° C. to about 750° C.;
mixing air preheated to a temperature in the range of from about 68° C. to about 720° C. with said preheated top gas and natural gas mixture in a mixing chamber; and 4. The process of claim 1 wherein said reformed gas forming step further comprises creating a highly endothermic reforming reaction in said reaction zone by exposing said gases to heated surfaces of direct reduced iron in said reaction zone,
wherein said direct reduced iron acts as a catalyst and the temperature of said gases decreases to a temperature in the range of from about 800° C. to about 850° C.

5. The process of claim 4 wherein said reforming reaction comprises:

$$CH_4 + CO_2 = 2H_2 + CO.$$

6. The process of claim 5 further comprising reducing said iron-containing metal oxides in said reaction zone to iron using said $H_2 + CO$ produced in said reforming reaction in accordance with the following reaction:

$$2FeO + H_2 + CO = Fe + H_2O + CO_2.$$

7. The process of claim 6 further comprising:
preheating and prereducing said iron-containing metal oxides feed by placing said feed into contact with an ascending portion of said reformed reducing gas.

8. A process according to claim 1 wherein said partial combustion takes place at a temperature of about 1000° C. to 1100° C.

9. The process of claim 4 wherein said direct reduced iron has a surface area of between 12 to 16 m²/gr. of iron.

10. The process of claim 3 further comprising: cleaning and dewatering said top gas leaving said reactor; and
supplying a portion of said cleaned and dewatered top gas as fuel to preheaters for preheating said top gas and natural gas mixture and said air.

11. The process of claim 1 wherein said air mixing step comprises mixing heated air enriched with $O_2$ with said heated top gas and natural gas mixture.

12. The process according to claim 1 wherein said top gas comprises from about 28% to about 36% hydrogen, from about 17% to about 21% carbon monoxide, from about 13% to about 17% carbon dioxide, from about 2% to about 7% methane, from about 16% to about 18% nitrogen and about 12% to about 17% water vapor.

13. A process according to claim 11 wherein said top gas is fed to a dewatering unit so as to adjust the water vapor content of said top gas to about 1% to about 3% prior to feeding said top gas to said melting furnace.

14. A process according to claim 1 including feeding a second fuel source to said melting furnace with said top gas.

15. A process according to claim 14 wherein said second fuel source is a material selected from the group consisting of coal, fuel oil, natural gas, heavy hydrocarbons and mixtures thereof.

16. A process according to claim 1 wherein said direct reduced iron withdrawn from said reduction reactor is heated by off gases from said melting furnace prior to feeding the direct reduced iron to the reaction zone of the melting furnace.

17. A process according to claim 16 wherein hot gases from said melting furnace preheat said scrap and said DRI metallized iron prior to introduction to the reaction zone of said melting furnace.

18. A process according to claim 1 wherein said DRI metallized iron withdrawn from the reduction reactor has a carbon content from about 12% to about 17%.

* * * * *

UNITED STATES PATENT AND TRADEMARK OFFICE
CERTIFICATE OF CORRECTION

PATENT NO. : 5,069,716
DATED : December 3, 1991
INVENTOR(S) : Oscar G. Dam G. Et al.

It is certified that error appears in the above-identified patent and that said Letters Patent is hereby corrected as shown below:

Column 6, claim 1, line 20 "form" should read --from--.
Column 6, claim 1, line 21 "mixtured" should read --mixture--.

Column 6, claim 2, line 45 after "formed" insert --reducing--.
Column 6, claim 3, line 53 delete "steps" and insert --step (e)--.
Column 6, claim 3, line 55 after "mixing" insert --in step (f)--.
Column 6, claim 3, line 56 delete "68°" and insert --680°--.

Column 7, first line of claim 10, delete "3" and insert --1--.

Signed and Sealed this

Twenty-second Day of March, 1994

Attest:

BRUCE LEHMAN

*Attesting Officer*     *Commissioner of Patents and Trademarks*